Mar. 27, 1923.

J. J. N. VAN HAMERSVELD

AUTOMATIC MACHINE TOOL

Filed Jan. 15, 1921

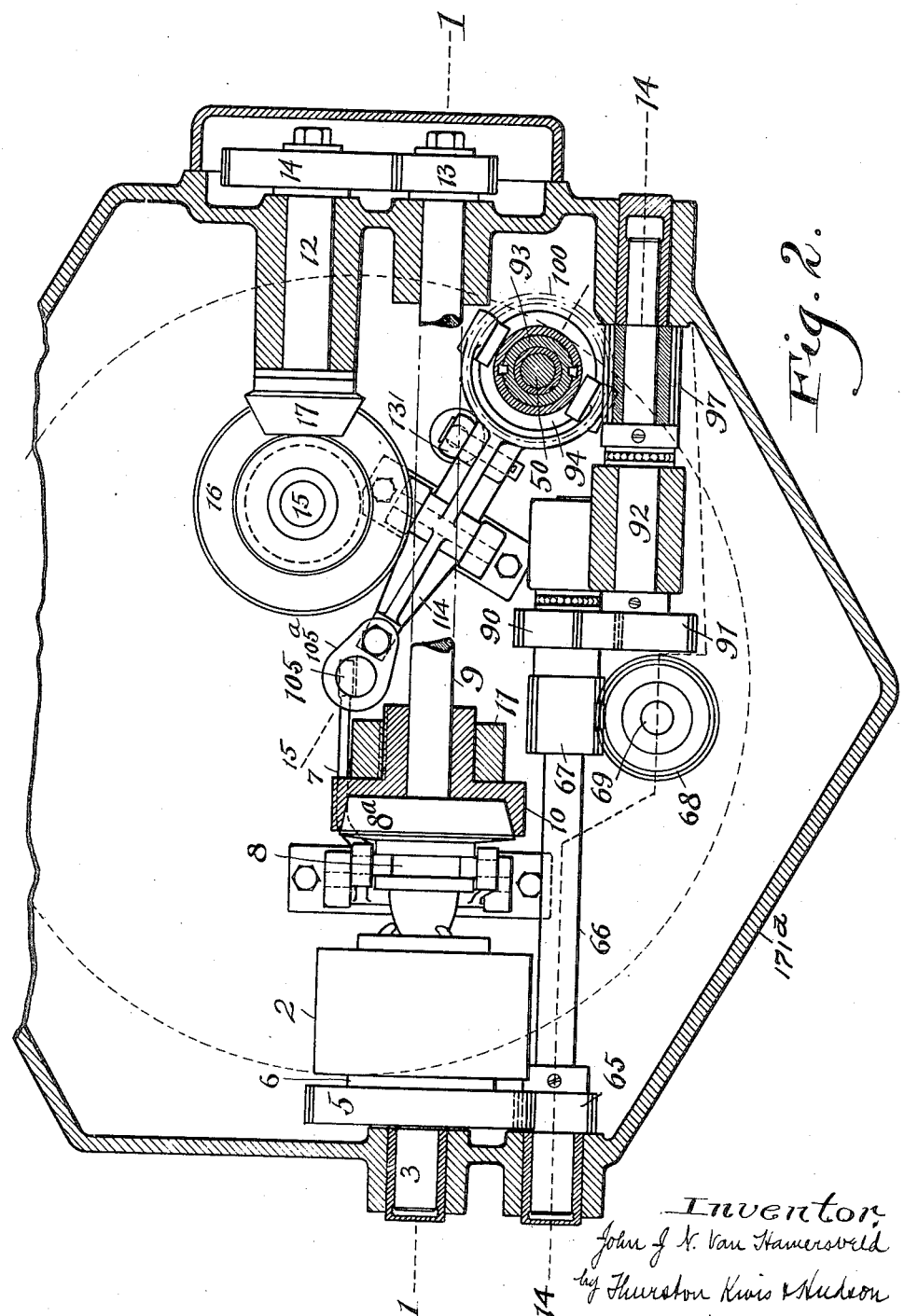

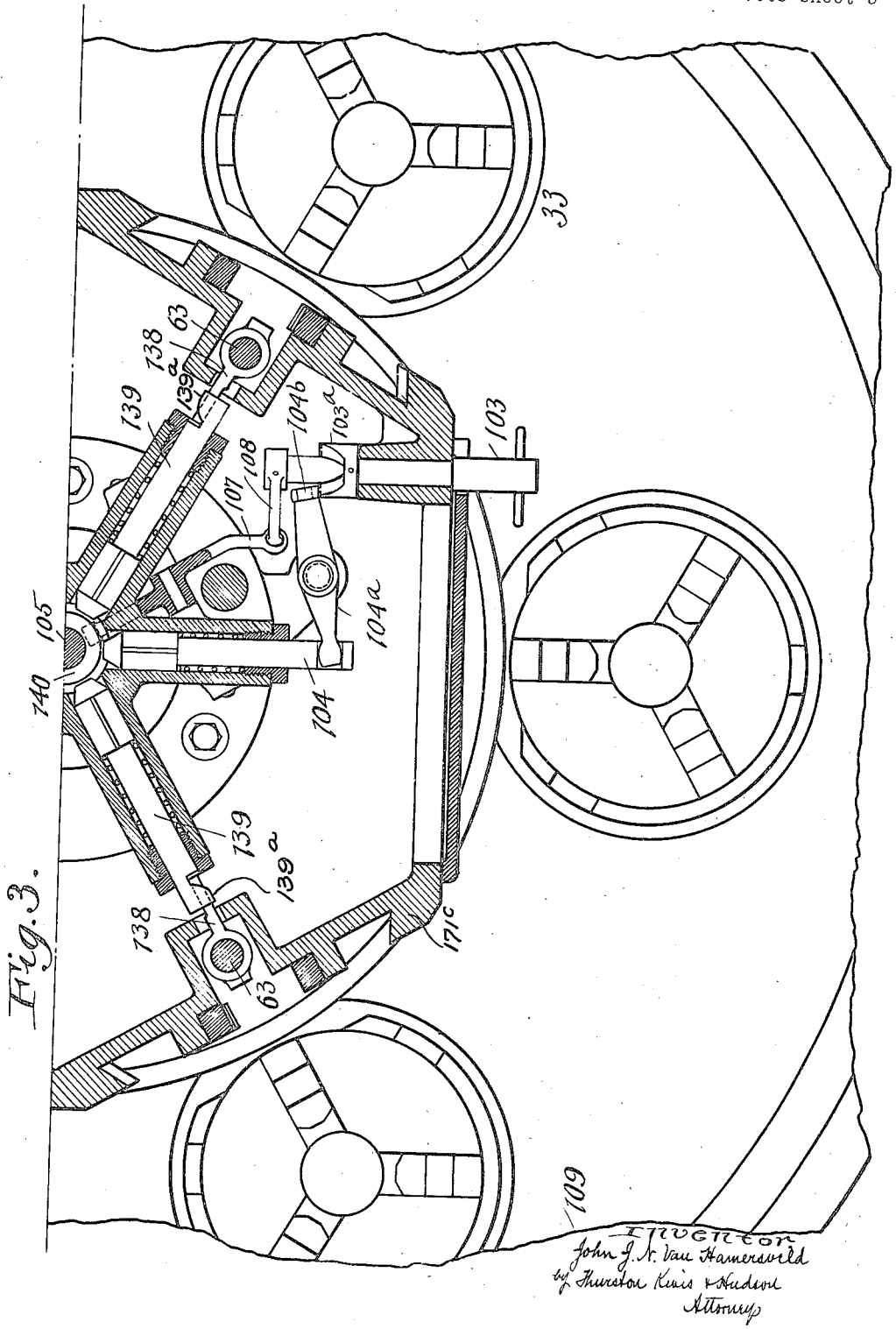

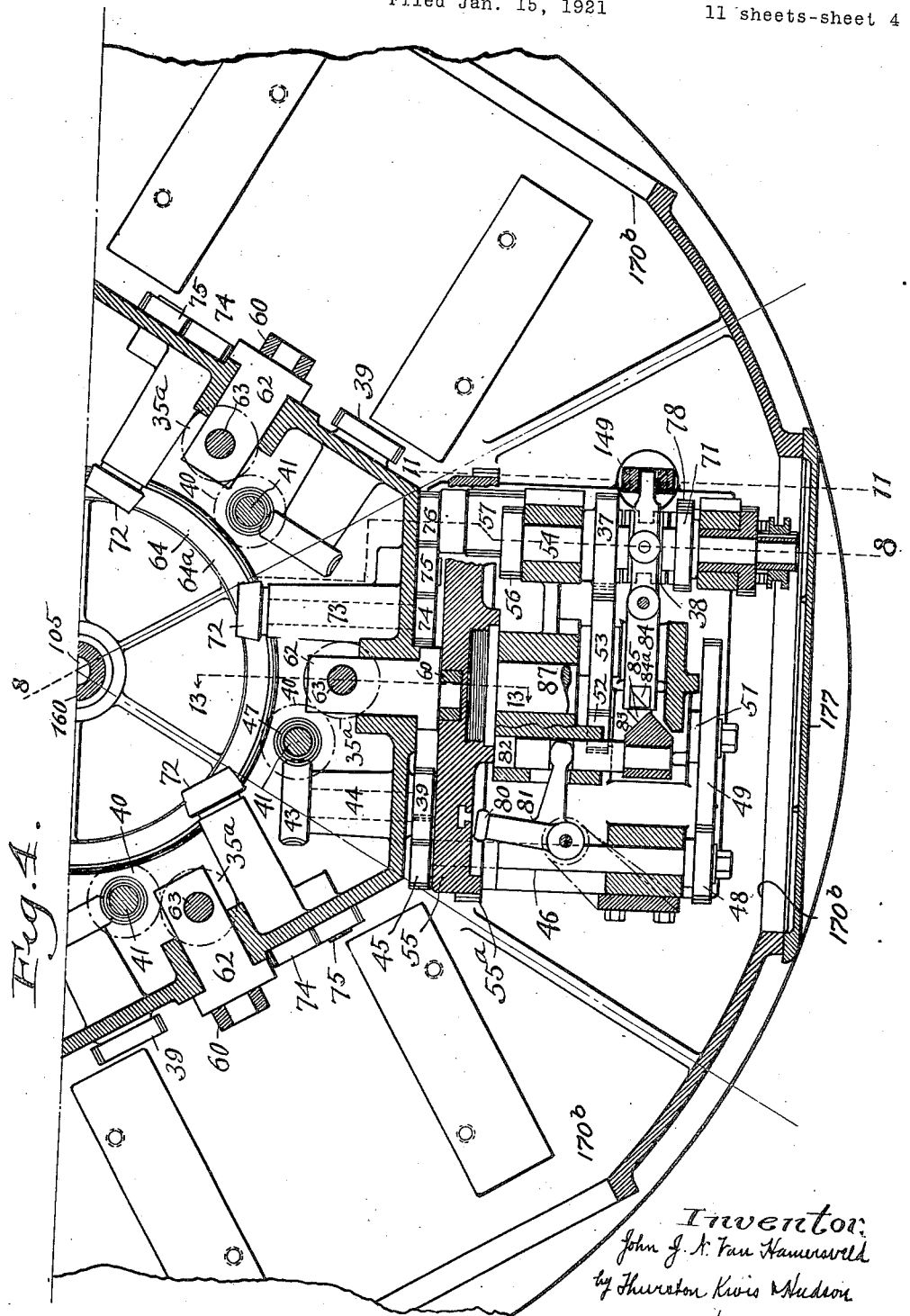

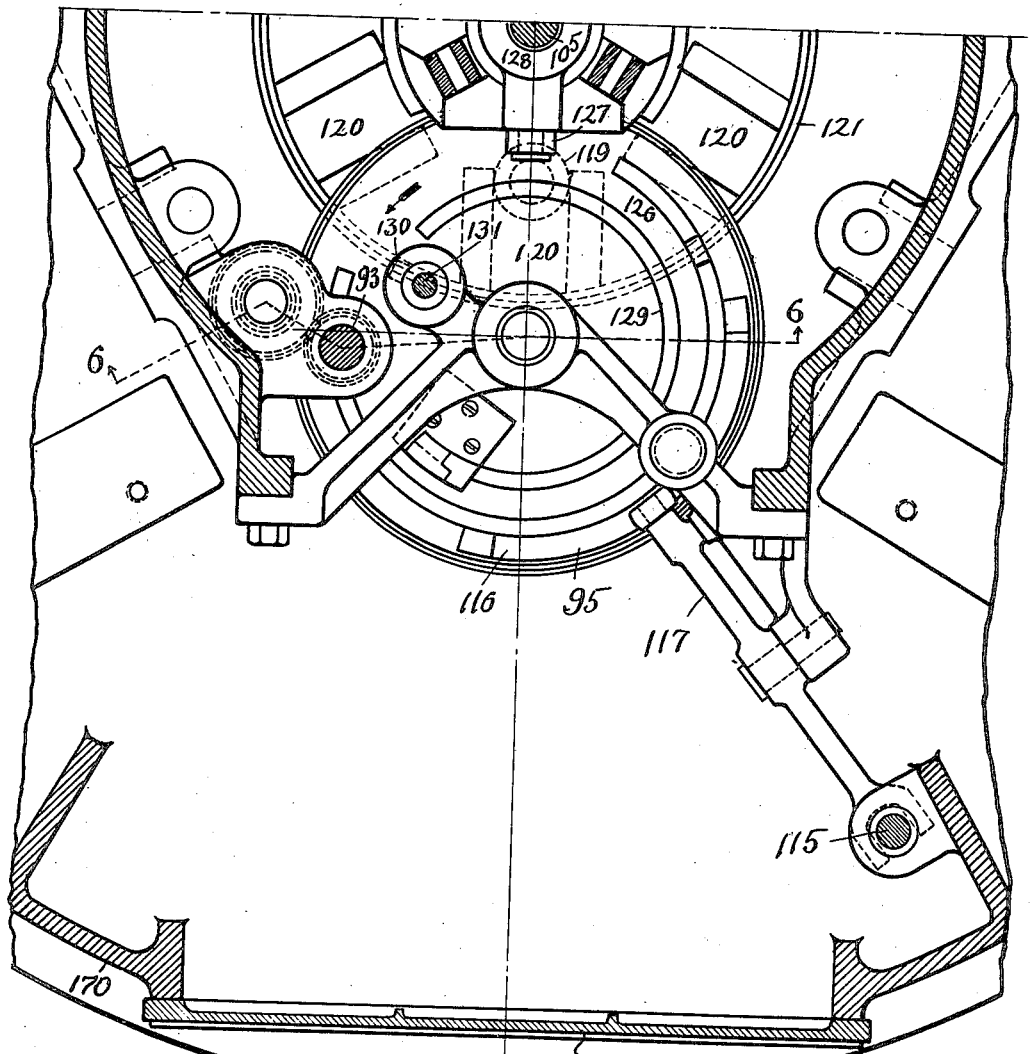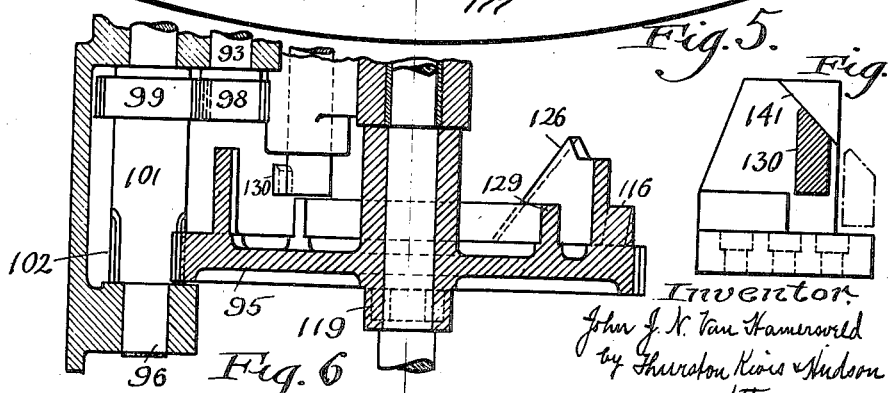

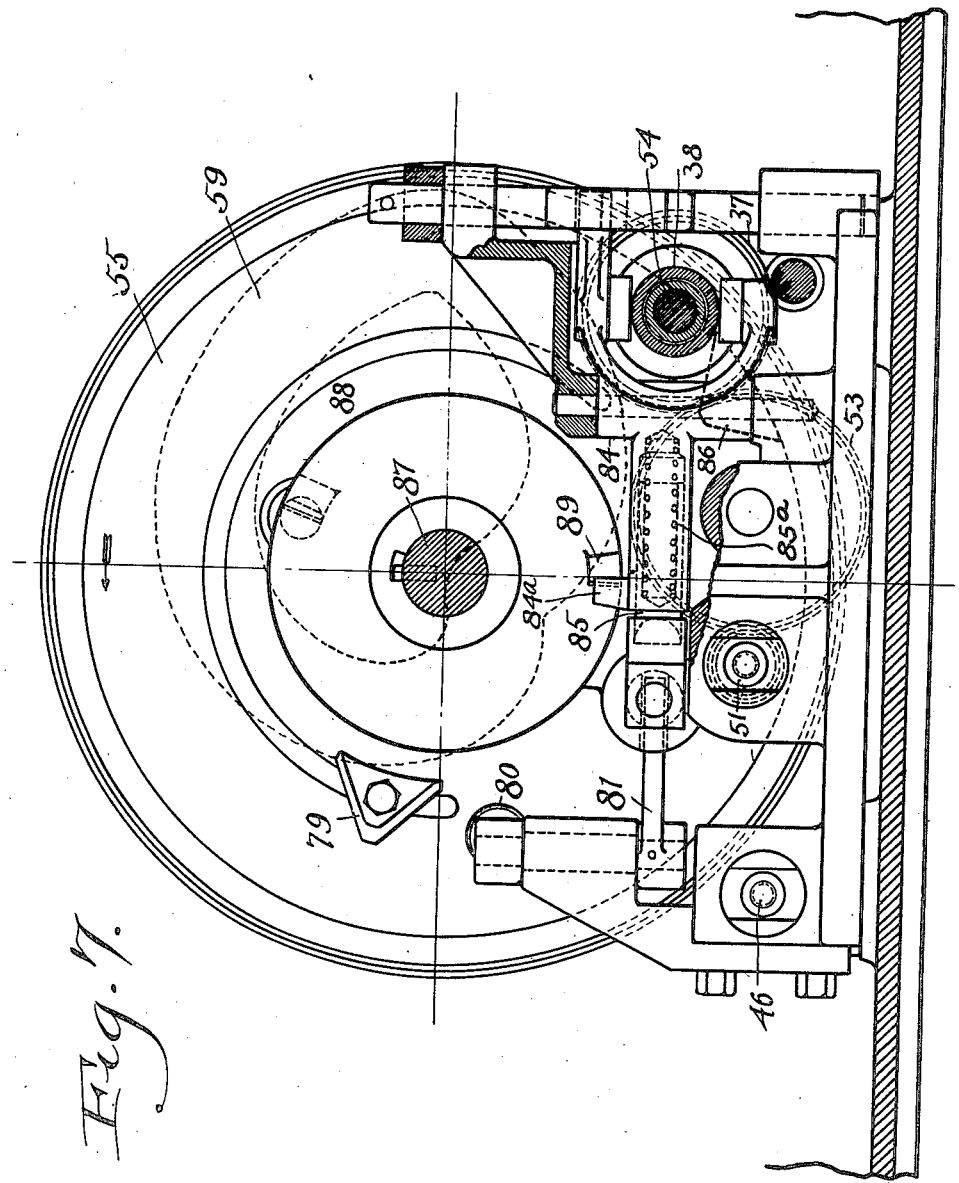

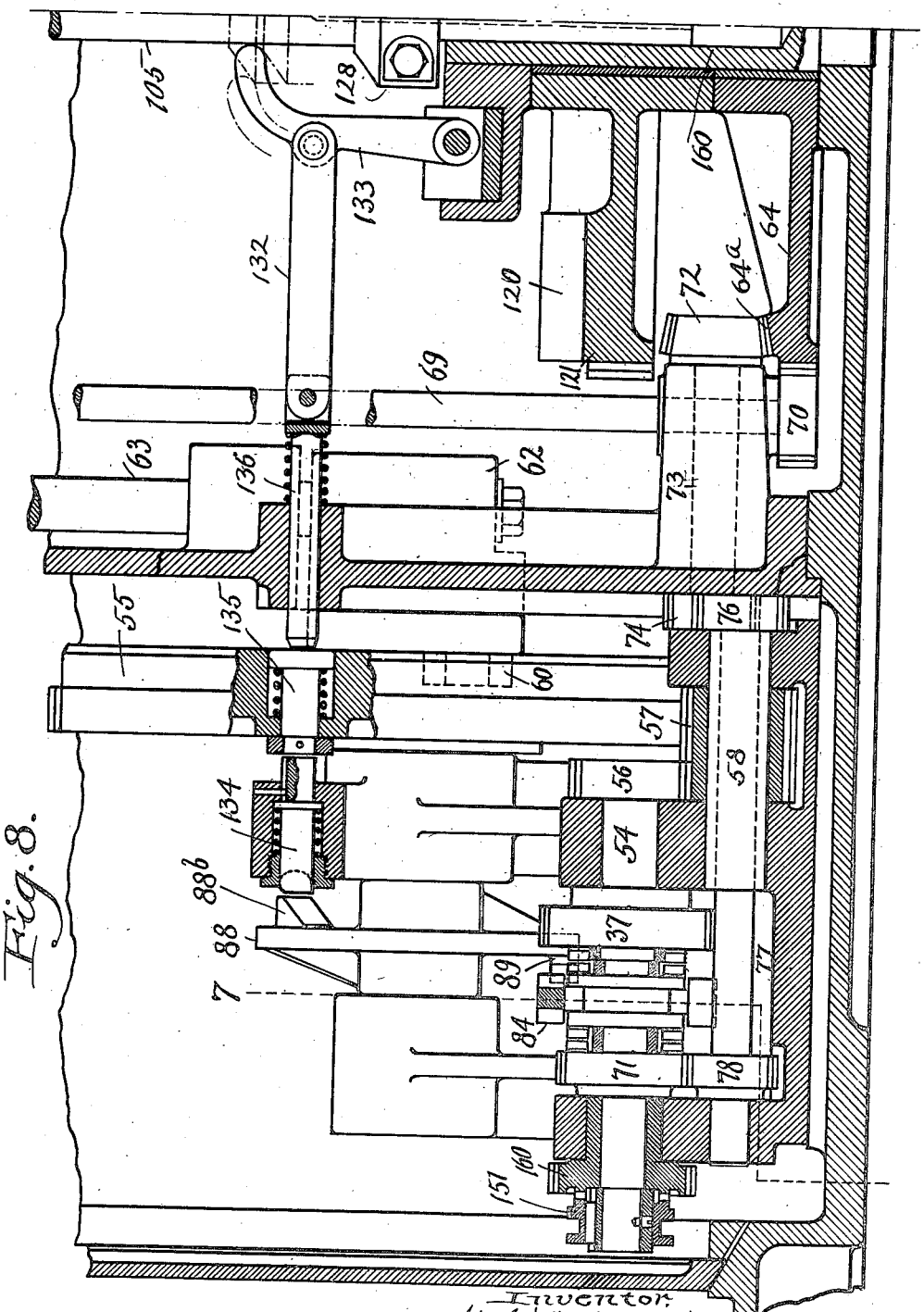

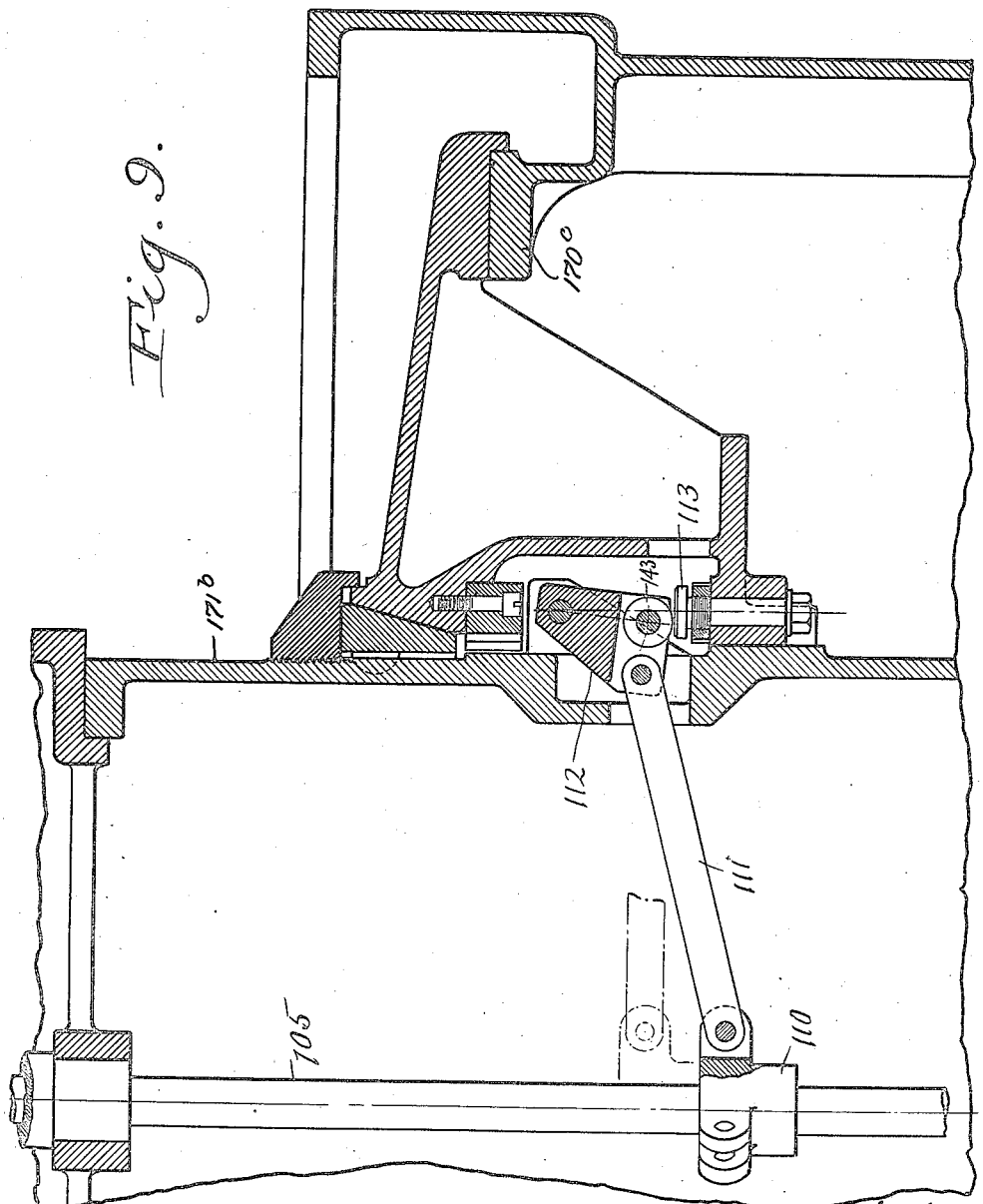

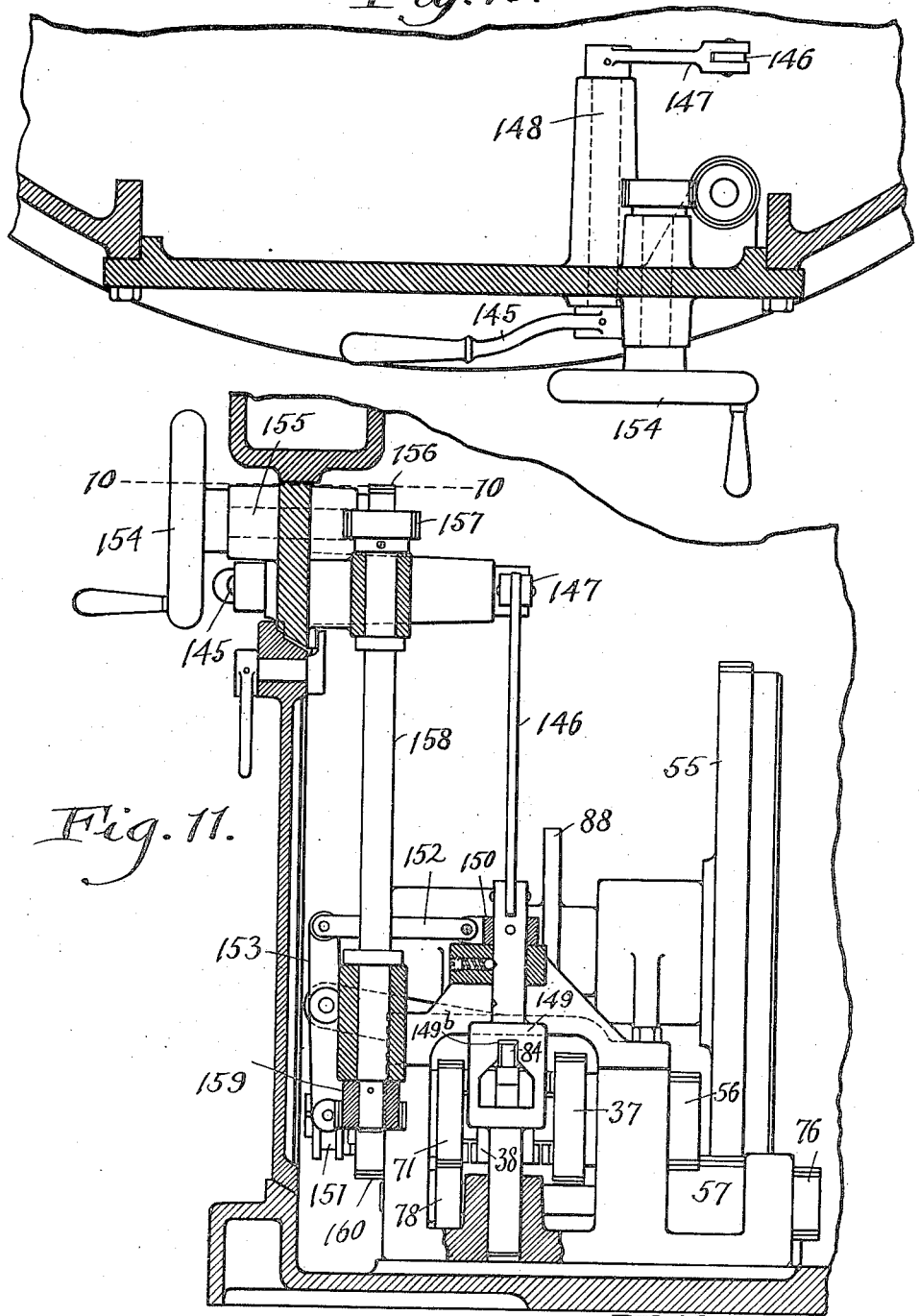

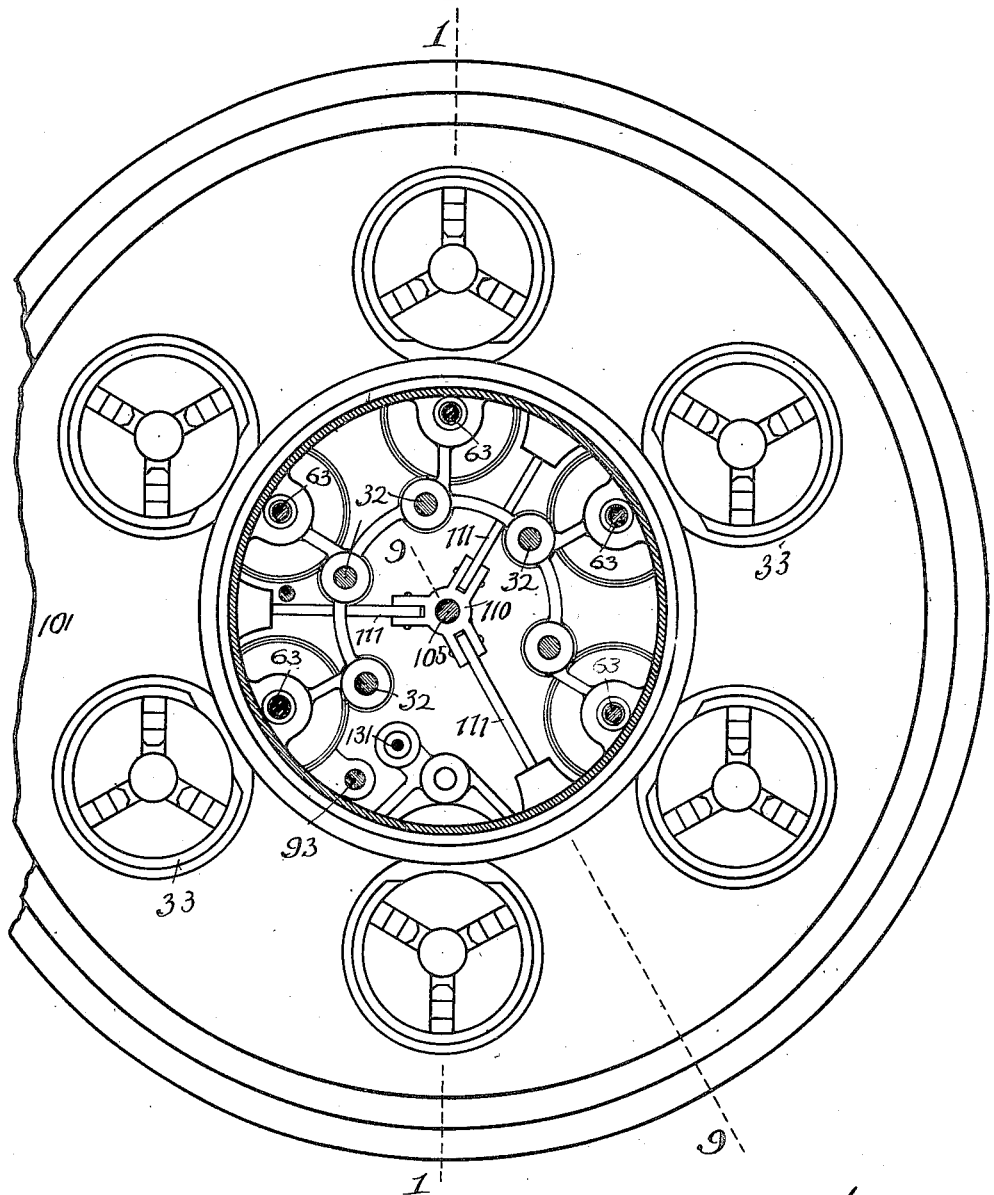

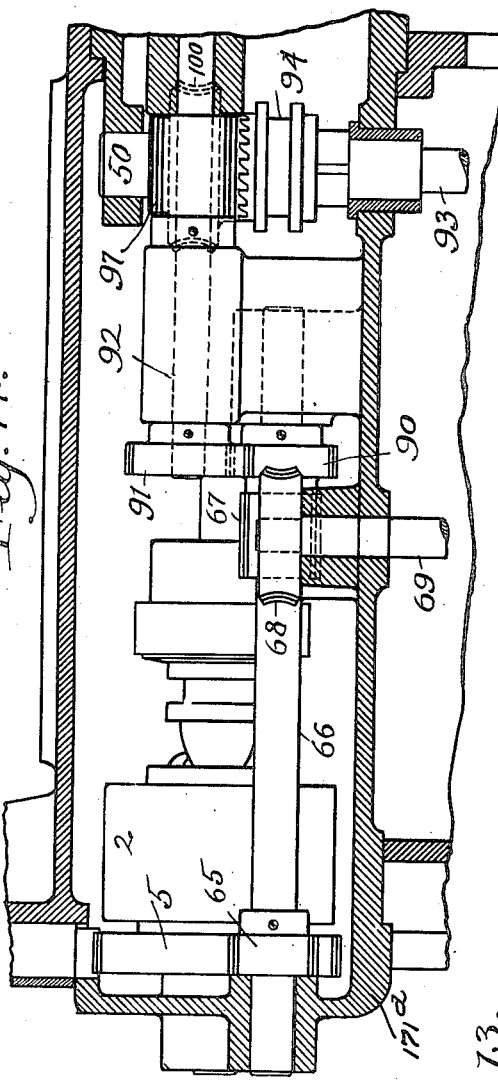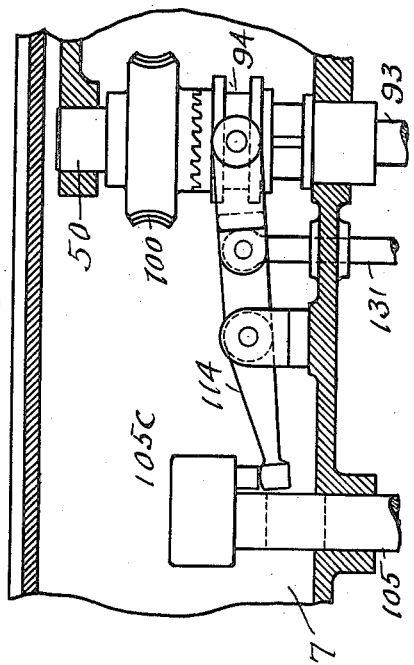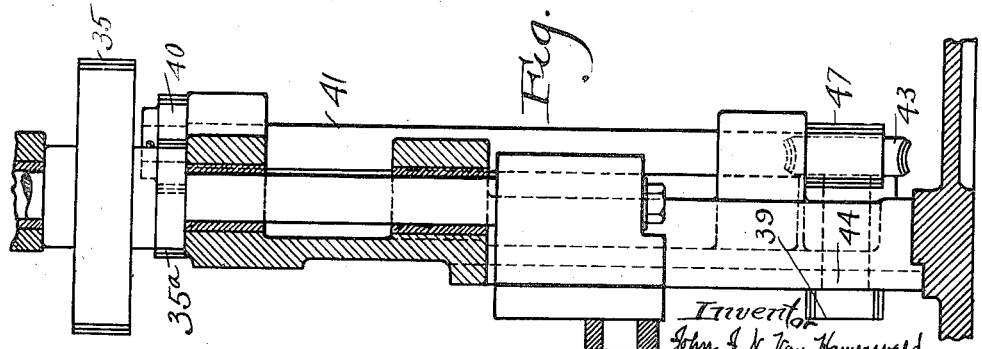

Patented Mar. 27, 1923.

1,449,465

UNITED STATES PATENT OFFICE.

JOHN J. N. VAN HAMERSVELD, OF CLEVELAND, OHIO, ASSIGNOR TO THE WARNER AND SWASEY COMPANY, OF CLEVELAND, OHIO, A CORPORATION OF OHIO.

AUTOMATIC MACHINE TOOL.

Application filed January 15, 1921. Serial No. 437,436.

*To all whom it may concern:*

Be it known that I, JOHN J. N. VAN HAMERSVELD, a citizen of the United States, residing at Cleveland, in the county of Cuyahoga and State of Ohio, have invented a certain new and useful Improvement in Automatic Machine Tools, of which the following is a full, clear, and exact description.

This invention is in the nature of an improvement in the kind of automatic machine tool which forms the subject matter of my application filed November 15, 1920, Serial No. 424,139.

The object of the present invention is to make a smaller, lighter, and cheaper machine than any machine heretofore known having similar purposes and capacities; and more particularly to produce a machine which is not as high as prior machines, and which is unlike them in that it does not have as its upper member a large heavy head which overhangs the column on the top of which it is supported.

Another object is to make the various mechanisms within the hollow frame of the machine easily accessible in order that they may be adjusted, repaired, or changed as circumstances may require.

Another object is to more effectively provide for the proper lubrication of the moving parts of the machine.

The present machine differs from the machine described in said prior application in many respects, but the most important difference, and the point where it also differs from any other prior machine with which I am acquainted is that the several mechanisms by which the tool slides are operated are located in the hollow base of the machine instead of in a large hollow head supported on the top of a central column. The location of the stated mechanisms within the base places them in a position where they can very much more conveniently be reached than if they were in such a head on the top of the machine, and likewise permits the building of a machine without any such large overhanging head as will be found in other known machines of this general character. Most of the other differences as between the present machine and the machine of my prior application are those which it has been found possible to make, or which are desirable or necessary because of the changed location of the mechanisms for operating the tool slides.

The invention consists in the construction and combination of parts shown in the drawing and hereinafter pointed out in the appended claims.

In the drawings, Fig. 1 is a central vertical section in the plane indicated by line 1—1 on Figs. 2 and 12;

Fig. 2 is a sectional plan view through the upper part of the central column in the plane indicated by line 2—2 on Fig. 1;

Fig. 3 is a sectional plan view of one half of the machine, the section being in the plane of line 3—3 on Fig. 1;

Fig. 4 is a sectional plan view of one half of the machine in the plane of line 4—4 on Fig. 1; with two of the feed units removed;

Fig. 5 is a sectional plan view in the plane of line 5—5 on Fig. 1, showing the Geneva motion mechanism;

Fig. 6 is a sectional elevation in the plane of line 6—6 on Fig. 5;

Fig. 7 is a sectional front elevation of one of the feed units, the section being in the plane of line 7—7 on Fig. 8;

Fig. 8 is a vertical section through one of the feed units and center column in the plane of line 8—8 on Fig. 4;

Fig. 9 is a vertical sectional view in the plane of line 9—9 on Fig. 12 showing the turret clamping mechanism;

Fig. 10 is a sectional plan view in the plane of line 10—10 on Fig. 11;

Fig. 11 is a sectional elevation in the plane of line 11—11 on Fig. 4;

Fig. 12 is a sectional plan view in the plane of line 12—12 on Fig. 1;

Fig. 13 is a sectional elevation in the plane of line 13—13 on Fig. 4, showing mechanism intermediate of the spindle drive and the feed unit;

Fig. 14 is a vertical section in the plane of line 14—14 on Fig. 2;

Fig. 15 is a vertical section in the plane of line 15—15 on Fig. 2;

Fig. 16 is a front view of the cam bracket as seen from the center of the machine and located on the Geneva motion gear.

The frame work of the machine is made up of a number of hollow castings secured together by bolts, screws, etc., according to common practice; and has when completed a large hollow base 170, and a hollow central column 171, these parts being provided with brackets and arms and the like in order to furnish the bearings and supports required by the various parts hereinafter referred to. The very lowest part 170ª of the base 170 is circular, and forms a well for containing oil into which various moving parts within the base will dip and thereby will pick up the oil required for their own lubrication, and will distribute oil in a very satisfactory degree to many other parts which do not actually dip into the oil. Above the circular lowest part thereof, the base has a part 170ᵇ which is in the form of a regular polygon in horizontal section. In the present case this part of the base is of hexagonal shape and the various sides thereof are provided with removable doors 177 through which access may be easily had to the adjacent machinery within the base. The upper part of the base is in the form of a circular track 170ᶜ the chief function of which is to support the rotatable turret near the margin thereof.

The central column 171 is hexagonal as to its lowest part. The hexagonal part 171ª of the column extends up to about the level indicated by line 5—5 on Fig. 1, and the sides thereof are parallel with the sides of the hexagonal parts of the base. The part 171ᵇ of the central column next above the hexagonal lower end and up to a plane a little above the level indicated by line 12—12 on Fig. 1 is circular and serves as the central bearing for the rotatable turret 109. The part 171ᶜ of the central column is hexagonal, the sides thereof being parallel with the hexagonal sides of the part 170ᵇ on the base.

Five of the sides of this hexagonal part of the turret support are provided with guides for five vertically movable tool slides 61. The sixth slide, which may be termed the front of the machine, does not carry a tool slide. This part of the machine is generally referred to as the loading side. When a spindle is adjacent this front side of the machine it is in what is termed the loading station. When in that station it does not engage any mechanism by which the spindle may be rotated, nor is there any tool slide adapted to cooperate with the spindle when in that station. The upper member, or as it is termed, the top unit 171ª, of the central column, is hexagonal in cross section. It is constructed as an independent piece, and is provided with a bottom or floor whereby this top unit may serve as a chamber for containing oil for automatically lubricating various parts mounted within the unit. It will be understood that this head unit is of substantially the same cross sectional dimensions as the part of the column next below on which it is supported.

A horizontal turret 109 embraces the cylindrical part 171ᵇ of the central column; and adjacent its outer edge this turret rests upon the upper horizontal edge of the circular flange 170ᶜ which forms the upper part of the base. This turret is accurately centered by a cone 180 which embraces the central column, which cone is fitted into a conical recess in the upper end of the turret. A nut 181 which screws onto the central column holds this cone down where it may perform the function of centering the rotating turret. Upon this turret six vertically rotatable work holding spindles 33 are rotatably mounted, these being spaced equal distances apart and being located equal distances from the axis of the turret. Mechanism which will be presently described is provided for imparting to the turret equal steps of movement each of which is through an arc of 60°. When the turret comes to the end of each of these periodical movements it is locked; and when locked five of the work carrying spindles are in working relation with the five tool slides referred to, and likewise in working relation with five trains of mechanism by which the spindles will be rotated. The sixth spindle will then be at the loading station. There is no train of mechanism for rotating the spindle which is at the loading station.

General mechanism.

Within this top unit 174 is the rotating member 2 of a friction clutch of conventional form, and which may be regarded as the main driving member of the mechanism of the machine. It is to be constantly driven from any suitable source of power, and to this end it may be provided with a spur gear 5 which meshes with a spur gear 4 for driving it.

A movable clutch member 8 is keyed to but is slidably mounted on a horizontal shaft 9; and this clutch member may be moved by a bell crank clutch operating lever 7 to the left as shown in Fig. 1, in which case the shaft 9 will be connected up with the clutch member 2 so as to be driven thereby; or it may be moved to the right with the result of causing the cone shaped end 8ª of said sliding clutch member to engage in a conical fixed brake seat 10 with the result of stopping the rotation of the shaft 9.

This shaft 9 extends through the front wall of the top unit (see Figs. 1 and 2), and it has a spur gear 13 removably secured to its outer end, which spur gear meshes with a spur gear which is removably secured to the outer end of a shaft 12 to whose inner end a bevel pinion 17 is secured; — the gears 13 and 14 being change speed gears. This bevel pinion 17 is constantly in mesh with a bevel gear 16 on the upper end of a rotatable shaft 15 which shaft acting through certain trains of gearing to be described rotates the five spindle driving mechanisms.

Within the top unit 174 is also a shaft 66 to which is keyed a pinion 65 in mesh with the constantly driven gear 5. On this shaft 66 is a worm 67 which engages with the worm wheel 68 on the upper end of a shaft 69, which shaft passes at its lower end within the base of the machine. A gear 70 (see Fig. 8) which meshes with a gear 64 within the base is rotatably mounted on an axis which is coincident to the central axis of the machine. The purpose of this gear 64 is to impart to the tool slides their quick motion through certain trains of mechanism of which there are five in the machine, one associated with each of the tool slides. Within the top unit 171$^d$ also is a shaft 92 which carries a pinion 91 which meshes with a gear 90 fixed to a shaft 66. A worm 97 secured to shaft 92 meshes with a worm wheel 100, which is rotatably mounted on a stationary shaft 50. This shaft is in vertical alignment with the vertical shaft 93; and this shaft may be clutched to the worm wheel by the action of a sliding clutch sleeve 94 having clutch jaws adapted to engage corresponding clutch jaws on the lower end of the worm wheel 100. This shaft 93 extends vertically downward into the base, and the function of this shaft is to rotate the Geneva motion gear 121 by means of pinion 98, gear 99, shaft 101 with pinion 102, and at its lower end is in mesh with said Geneva motion gear which through mechanism to be described imparts to the turret its step by step rotary motion.

The clutch operating lever 114 within the top unit is the element through which directly the clutch sleeve 94 is moved. The mechanism for automatically operating this clutch lever will be presently described.

*Spindle operating mechanism.*

The vertical shaft 15 before referred to has secured to it a plurality of spur gears 18, 19, 20, 21, 22, 23, of different diameter, thereby forming a gear cone. These gears severally mesh with gears of a series of concentrically mounted sleeves 24, 25, 26, 27, 28, 29, which are rotatably supported in a fixed vertical hollow sleeve 30. Each of these gear sleeves 24 to 29, inclusive, carries not only the gear which meshes with one of the gears of the gear cone referred to, but also carries another gear,—all of these latter gears being of the same diameter.

There are within the machine five vertical spindle driving shafts 32. On each of these is a gear 31 having a tongue and groove driving connection therewith. This gear may be moved up and down upon shaft 32 into engagement with any equal size gears on the six gear sleeves 24 to 29 above referred to, and therefore, depending upon the position of the associated gear 31, each of the shafts 32 may be driven in any of six different speeds. Each of the shafts 32 is for driving a spindle in a working position; and it accomplishes this result by means of pinion 34 fixed to shaft 32 which meshes with an idler gear 35. Near the bottom of each spindle is a spur gear 36 which when the turret comes into any one of its several working positions will roll into mesh with the idler gear 35 at the station to which the spindle has been brought, and thereby the spindle will be rotated.

*Tool slide operating mechanisms.*

As before stated, there are five tool slides 61 movably supported on five of the six flat sides of the central column. Associated with each tool slide is a tool slide operating unit; and all of these operating units are located in the base of the machine just inside of certain removable doors 177, which, when removed, permit easy access to the tool slide operating mechanism. Each tool slide operating unit includes a cam disk 55 rotatable upon a horizontal axis having in its inner face a continuous cam groove 59. A vertical sliding bar 63 is connected at its upper end with the associated tool slide 61. Near its lower end a block 62 is fixed to this rod, and this block carries a roller 60 which projects into the cam groove 59. By one complete revolution of the cam disk the tool slide is caused to move down and then up to its starting point. This cam disk is formed with a peripheral gear 55$^a$ which is always in mesh with a pinion 57 said pinion being rotatably mounted on a nonrotatable sleeve 58. This pinion 57 is in mesh with a pinion 56 which is fast to a shaft 54 on which are loosely mounted two clutch gears 37 and 71, each provided with clutch teeth for engagement with clutch teeth on the ends of a sliding clutch member 38 which has a tongue and groove connection with said shaft. When either of these two gears 37 and 71 is clutched to the shaft 54 that shaft will be rotated and through the train of mechanism described the cam disk 55 will be rotated at fast or slow speed, as the case may be.

*Slow motion for each tool slide.*

The clutch gear 37 is the slow clutch member of the tool slide operating unit. This member 37 is driven through a train of mechanism from the same shaft 32 which drives that spindle which is in working relation with the associated tool slide.

The train of mechanism referred to (see Figs. 4 and 13) consists of a pinion 35$^a$ on the hub of the idler 35 before mentioned which meshes with a pinion 40 fixed to a shaft 41 which has on its lower end a worm 47. This engages a worm wheel 43 fixed to a horizontal shaft 44 which carries a pinion 39. This pinion meshes with a pinion 45 fixed to a horizontal shaft 46 on the outer end of which a change speed gear 48 is removably secured. This gear 48 meshes with a change speed gear 49 fixed to the outer end of a parallel horizontal shaft 51 which has secured to its rear end a pinion 52 which in turn meshes with the idler 53 which meshes with the slow speed clutch gear 37.

From the foregoing it will be seen that when any feed slide mechanism is being operated by the slow clutch gear 37 its movement will be in timed relation with the rotation of the associated spindle. This timed relation may be varied by removing the gears 48, 49 and substituting other gears in their place.

Fast motion for each tool slide.

Fast gear clutch member 71 receives its motion through an entirely different train of mechanism, a part of which has been already explained. The gear 64 (see Figs. 4 and 8) which is rotated by shaft 69 is provided with skew beveled gear teeth 64ª. In mesh with this are five skew beveled gears 72 one of which is associated with each of the feed mechanism units, there being of course five of such gears 72. Each is fixed to a shaft 73. Each shaft carries a gear 74 in mesh with an idler 75 which is in mesh with the gear 76, which gear is fixed to the inner end of a shaft 77 which is rotatably mounted in the non-rotatable sleeve 58, and has at its outer end a gear 78 which is in mesh with the clutch gear 71.

Operation of the feed unit.

At all times therefore the fast clutch gear 71 is in rotation, at a constant speed. The slow clutch gear 37 is rotated only when the work spindle rotates. By sliding the clutch sleeve 38 in one direction or the other, these two clutch gears will be selectively connected with shaft 54 and thereby through the mechanism which has been described the cam disk 55 which operates the tool slide will be turned slow or fast, as the case may be.

A clutch operating lever 84 is provided, by means of which a clutch sleeve 38 may be moved from the neutral position in either direction so as to thereby engage the clutch gear 37 or the clutch gear 71 to the shaft 54, and this clutch lever is automatically moved to produce these results automatically in proper timed relation to each other and to the other automatic movements of the machine. This lever 84 carries a bevel spring plunger 85 in its outer end said plunger being actuated by a spring 85ª. Adjacent this is a sliding bar 82 carrying a bevel spring block 83 in position to engage with the end of the spring plunger 85. This sliding bar is under the control of a bell crank lever 81, one arm of which engages in a slot in the sliding bar. The other arm carries a roller 80 and extends to a position such that said roller will be engaged by one or the other of two cams or dogs 79 and 86 carried by a cam disk 55. See Fig. 7.

The cam 79 is adjustably mounted on the cam disk 55 and is to be located at a position such that when the cam disk by its rotation has moved the tool slide down on quick motion to the point where the tool which it carries is about to begin to do the work for which it is provided, that is to say, is about to begin to cut a piece of work secured to the associated spindle, it will engage the roller 80 on the bell crank lever, and therefore move the clutch lever so as to cause the slow clutch gear 37 to be connected with the shaft 54.

The tool slide therefore continues its downward movement at slow speed, and as it has reached its lowest point it will remain stationary for a short period and then the fixed cam 86 engages the roller 80 of the bell crank lever 81 and rocks the lever in the contrary direction, and thereby moves the bar 82 and the spring block 83 thereon in that direction which causes it to rock the lever 84 and disconnect the clutch gear 37, and engage the clutch gear 71; whereupon the tool slide returns in quick motion.

Geneva motion drive.

As before stated, the center gear 121 is provided with six equally spaced radial slots. The shaft 93 before mentioned has a spur gear 98 on its lower end which meshes with a spur gear 99 on a gear sleeve 101, which is rotatably mounted on a fixed shaft 96, and has a pinion 102 on its lower end in mesh with the Geneva motion gear 95. The gear 95 has a roller 119 mounted on its lower face for engagement serially in the six radial slots 120 on the center gear 121, whereby said gear 121 is rotated at intervals, and through one sixth of a revolution. The turret 109 is directly geared to the center gear 121 by means of a pinion 122, shaft 123, pinion 124, and internal gear 125 bolted to the turret 109.

Control mechanism.

The mechanism for automatically controlling and bringing about the proper sequential action of the various mechanisms are generically like the corresponding control mechanisms as shown and described in my said prior application. But as these control mechanisms are shown in the present application they embody numerous more or less important specific differences, as will appear from the following description thereof:

The chief control member is the vertically movable control rod 105 which is centrally placed within the open frame work of the machine, and is under the influence of a spring 106 to force it down. The lower end of this control rod projects and is slidable in an air dash pot substantially like that which is shown and described in said prior application.

Another control member of importance is the rotatable disk 88 which is carried by the same shaft 87 to which the vertical cam disk 55 is secured. A narrow tongue carried by the shaft projects into a somewhat wider groove in the inner periphery of the hub of the control disk (see Fig. 7), and this tongue and groove connection is such that when the shaft is turning forward the control disk must turn with it; but nevertheless the control disk is capable of being turned forward a short distance independently of the shaft. The principal function of this control disk 88 is to cause the movement of the clutch sleeve 38 to neutral position, thereby disconnecting the tool slide operating mechanism from any means for driving it. It will be understood that there is one of these control disks associated with each tool slide operating unit disposed within the base of the machine.

This control disk carries two beveled lugs 88[b] and 89. The beveled lug 88[b] is that through which the control disk is turned forward slightly independently of shaft 87 as the center control rod goes up. There is a beveled collar 128 (see Fig. 8) on the center control rod which engages directly with the sliding spring pin 136 mounted in the frame which pin is then aligned with a spring pin 135 carried by the cam disk 55, and this in turn is aligned with a spring pin 134 sliding in a fixture. This latter pin has a beveled end for engagement with the beveled lug 88[b]. As the control rod 105 goes up the collar 128 by engaging a lever 133 connected to spring pin 136 pushes the three aligned pins referred to, and the latter with its beveled end engages the lug 88[b] and turns the control disk as stated. The beveled lug 89 of the control disk is for the purpose of moving the clutch operating lever 84 to the neutral position, and it performs this function by engaging a lug 84[a] on the clutch operating lever 84 just as the cam disk 55 is completing its revolution. When by the movement of the lever 84 the clutch member 38 is moved to the neutral position the cam disk 55 and the control disk 88 will stop. When, however, the control disk 88 is turning forward on shaft 87 by the action of the three aligned pins referred to, the lug 89 passes over the lug 84[a] and thereby releases lever 84. Thereupon the action of the spring plunger 85 carried by said lever and the beveled spring block 83 causes the lever 84 to be moved sidewise to the same position which it was in before it was moved to the neutral position, as stated. Before said movement to neutral position the clutch member 38 was engaged with the fast clutch gear 71 as the tool slide was being moved up at fast speed. After the control disk has been moved as stated the fast clutch gear 71 will be again connected with the cam disk shaft, and therefore it will turn at high speed as it moves the associated tool slide downward, which condition of affairs will continue until, as before stated, the adjustable dog 79 on the cam disk causes such a movement of the spring point 83 as will carry it over the point of the spring plunger 85, whereupon lever 84 will be quickly moved so as to carry clutch sleeve 38 out of engagement with the fast clutch gear 71 and into engagement with the slow clutch gear 37.

*Turret clamping mechanism.*

The turret as stated rotates about the central column 171, and near its edge is supported upon a vertical cylindrical flange 170[c] which is a part of the base. Although there is a locking pin 115 to lock the turret against rotation, it is also desirable to clamp the turret down on this base flange when the turret has been so locked. To that end several (in the present case three) toggles are provided. See Fig. 9. Each consists of a toggle joint arm 112 pivoted near its upper end to the frame and carrying on its lower end a roller 143 for engagement with the upper end of an adjustable thrust pin 113 which is adjustably fixed to the turret. The other toggle member is the link 111 which is pivoted to the toggle joint arm 112 and to a spider 110 fixed to the central control rod 105. The parts are constructed in proportion substantially as shown in Fig. 9, whereby when the control rod 105 is down the described mechanisms will relax their clamping action on the turret, since each of the toggle joint arms 112 will have been swung inward away from the vertical position. But when the center control rod is moved up, which action takes place after the turret has reached and has been locked in a new position, the links 111 will be moved to the horizontal position, and thereby the toggle joint arms 112 will be moved toward vertical positions, and will thereby thrust the turret down and cause it to be clamped down upon the base flange.

*Automatic operation of mechanism.*

When the tool slides have completed their cycles and are all stopped in their uppermost position, the center control rod 105 is in an elevated position and is held up by a manually operated locking pin 104 the inner end of which projects beneath a collar 140 on the control rod. In order to set the machine in operation and cause it and its various parts to go through their respective cycles, the operator by turning the handle rod 103 withdraws the lock pin 104 and thereupon the control rod drops as the result of the action of the spring and its own gravity.

During the first part of the downward motion of the control rod 105 the spindle driving clutch 2 will be disengaged by means of clutch shifting lever 7 which will move the movable clutch member 8 to the right and force said clutch member 8 in the brake seat 10, as shown in Fig. 1, whereby the rotation of the shaft 9 is stopped almost instantly, and consequently all the mechanisms driven by said shaft will stop,—said mechanisms including the spindle rotating mechanisms, and the mechanisms for imparting slow feed movement to the tool slides. As the control rod 105 goes down the turret 109 will be unclamped by means of a centerpiece 110 pulling on three links 111, and toggle joint arms 112 having rollers 143, as by this action the arms 112 swing away from their perpendicular position and release the pressure on the three pins 113 mounted in the turret 109. As the control rod goes down still further it will engage the Geneva motion control clutch which is in the top unit (see Figs. 2 and 15) by reason of the fact that a collar 105ª on the center control rod engages and moves the lever 114, thereby closing the clutch 94 and starting the Geneva motion gear 95, located in the base of the machine.

The first function of the Geneva motion gear is to withdraw the turret lock bolt 115 (see Figs. 1 and 5) by means of an arc-shaped cam 116 secured to the Geneva motion gear. This rocks lever 117 which in turn engages a shoulder carried by the lock bolt and pulls the lock bolt 115 down out of the socket in the turret with which it is engaging. The roller 119 mounted on the Geneva motion gear 95 will now enter one of the slots 120 in the center gear 121 and rotate said center gear a distance of 60° whereby the turret 109 will also be rotated 60° by means of gear 122, shaft 123, gear 124, and internal gear 125 mounted on the turret 109, the gears 121—122, and 124—125 having equal ratios.

When the turret 109 has gone through a part of its motion a cam 129 on Geneva motion gear 95 (see Figs. 6 and 15) will begin to act to prevent the Geneva motion control clutch 94 from disengaging when the control rod 105 is raised, by passing under the lower end of a vertically movable rod 131 which at its upper end is pivotally connected with the clutch operating lever 114.

When the turret 109 has nearly completed its desired movement a cam 126 on the Geneva motion gear 95 (see Figs. 1, 5 and 6) will start to raise the control rod 105 by means of roller 127 mounted in a push block 128 which is secured to said center control rod near its lower end.

When the control rod has been raised about ¾ of an inch it will disengage the clutch shifting member 8 from the brake seat 10 by raising the clutch shifting lever 7. The Geneva motion gear will now release the lock bolt 115 so that as soon as a lock bolt socket 137 in the turret comes to register with said lock bolt the spring 118 will cause it to enter the same and so lock the turret in its new position.

As the control rod continues its upward movement the three toggle joint arms 112 (see Fig. 9) with their roller 143 will be pushed to their vertical position by means of the center piece 110 and the three links 111, and when the control rod comes to a standstill the turret will be clamped down on the base flange 170ᶜ.

The control rod 105 as it goes to its highest position will cause the spindle driving clutch 2 to close and thereby start up the spindle drives. At the same time the push block 128 (see Fig. 8) will force the five levers 133 outward and then will in turn force forward the five control disks 88 through a part of their rotatable distance, each lever moving its associated control disk by means of a link 132, connected with a sliding spring pin 136, a sliding spring pin 135 mounted on cam disk 55 and a spring pin 134. The three pins at this time are in alignment, and the pin 134 has a beveled end for engagement with cam lug 88ᵇ. The resulting forward turning of the several control disks 88 release the five clutch operating levers 84 which thereupon act automatically to move the sliding sleeve 38 to move into engagement with the fast clutch gear 71; the result being to start all the feed units in quick motion.

As soon as the five vertical cam disks 55 start to rotate the five tool slides will start to lower in quick motion, and the five pull back arms 138 (see Fig. 1) on the rod 63 will release the five catch pins 139, which pins will then be moved by their respective springs beneath the collar 140 on the control rod, whereby, as this control rod lowers a short distance, as it does after it has reached its highest point, it will come to rest with the collar 140 resting on the five catch pins 139. The slight lowering of said control rod before it comes to rest also allows the levers 133 and the pins 134—135 and 136 to come back to their former positions.

While this has been going on the Geneva motion gear has been in rotation and has passed through slightly more than one-third of a revolution during which it has completed all of its indexing functions. It will now complete its revolution, however, because it still remains connected with its driving mechanism. When it has substantially completed its revolution a beveled dog (see Fig. 1, 5, 15, and 16) on said Geneva motion gear will disengage the Geneva motion control clutch 96 by reason of the fact the beveled dog 141 will engage the top of a beveled lug 130 fixed to the lower end of rod 131, which as stated is connected with clutch operating lever 114 of the Geneva motion clutch. A spring point 132 (see Fig. 1) will act on gear 95 and will turn it a short distance after the disengagement of the clutch 94, and thereby insure that the beveled lug 130 shall be freed from dog 141, and then the Geneva motion gear will come to rest.

Each of the tool slides 61 moving downwardly in quick motion will reach a point where it should start to move in slow motion in order that the tools carried by the slides may do their allotted work. This change from the quick to the slow motion mechanism will be effected by the action of the adjustable cam dog 79 upon the clutch bell crank 81, which moves bar 82, thereby causing, through the mechanism before described, the movement of clutch sleeve 38 out of engagement with fast member 71 and into engagement with slow member 37.

After completing the cut the dog 86 on said vertical cam disk will operate through the described mechanism, again shift the clutch 38 from the slow feed member 37 to the fast member 71, and said tool slide will then move up in quick motion.

*Stopping and starting mechanisms.*

In this machine as in the machine of my prior application before mentioned, there are five spring catch pins 139, one associated with each tool slide, the functions of said catch pins being to engage beneath the collar 140 on the center control rod and so hold it up; each catch pin being spring-actuated to move it in the collar engaging direction. Each catch pin has adjacent its outer end a lug 139ª which is so located that it will be engaged by the inclined face of a pull back arm 138 fixed to the slide operating bar 63 of the associated tool slide.

As each tool slide moves up while returning to its home position the associated pull back arm will withdraw the associated catch pin; but until the slide having the slowest movement reaches the top of its path, and withdraws the catch pin associated with it, the center control rod can not drop. When, however, the last catch pin is withdrawn the control rod will drop and so initiate a new cycle of the machine if not prevented from dropping by the manually movable operator's catch pin 104 which is arranged to engage with the same collar 140. (See Fig. 3.) This catch pin 104 is also spring actuated in the collar-engaging direction, and will move automatically into the operative position when permitted to. In order that this catch pin may be withdrawn, a lever 104ª is provided,—which lever engages the catch pin at one end and has a roller 104ᵇ for engagement with the cam collar 103ª fixed to a manually turnable shaft 103 which is mounted in the front wall of the central slide supporting collar, the front wall being that wall which is at the so-called loading station. By turning this shaft 103 through an arc of 90° to the right or left this operator's catch pin is withdrawn.

If the removal of a finished piece of work from the spindle at the loading station and the securing to said spindle of another piece of work to be machined can be easily accomplished during the time required by the tool slide which works most slowly to complete its cycle, it may be desired that the machine shall work continuously instead of automatically stopping when the tool slides have all reached their upper or home positions. The machine contains means associated with this shaft 103 by which the machine may be made to operate continuously or to automatically stop as desired.

A pivoted lever 107 has one end projected into the path of the collar 140 of the center control rod 105. The other end of this lever extends to a point where it may engage the end of an arm 108 which is fixed to the inner end of the shaft 103. If to withdraw the catch pin, the operator turns the shaft 103 to the left, the end of the arm 108 is brought into substantial contact with the lever 107. Under these conditions, when the control rod 105 descends it will rock lever 107, and the lever will by its action on arm 108 turn rod 103 so as to release the catch pin and leave it free to automatically engage the collar 140 on the control rod when said control rod again moves upward. The result will be that the machine will stop at the end of each cycle; and therefore the operator must manually turn shaft 103 to start the machine again in operation. If, however, he turns the rod 103 to the right the arm 108 will be carried away from lever 107 and therefore when this lever is rocked by the descending control rod it will produce no effect on shaft 103. Therefore said shaft will remain in the position to which it was moved, and the catch pin 104 will be permanently held out of action, with the result that the machine will run continuously.

As it may be desirable to stop a tool slide during its cutting period for inspection or adjusting a tool or tools carried thereby, the following mechanism will enable this to be done and will permit the tool slide to be raised and lowered by hand without interfering with any of the automatic functions of the machine. It will be understood that a mechanism for this purpose is associated with each tool slide and the feed mechanism therefor.

A rock shaft 148 (see Figs. 10 and 11) is mounted in a bracket on the front side of the hexagonal base, and it has an operating handle 145, and crank arm 147 on its inner end. This crank arm is connected by a link 146 to a vertically movable slide 149 through the lower end of which is a hole through which the clutch operating lever 84 passes. (See Fig. 4.) The upper end of this hole is beveled in both directions and narrowed, and it terminates in a narrow slot 149$^b$. By turning the handle 145 this slide 149 is pushed down and the beveled edges of the hole therein will engage the clutch operating lever 84 regardless of the position in which it might be and will move it to neutral position, thereby disconnecting the associated tool slide from the driving mechanism.

A collar 150 is secured to the slide 149 and this is connected by link 152 with a pivoted lever 153 by means of which clutch 151 is closed thereby connecting a spiral gear 160 loosely mounted on shaft 54. This spiral gear is in mesh with a spiral gear 159 on the lower end of a shaft 158 which at its upper end has a spiral gear 157 which spiral gear is in mesh with a spiral gear 156 fast to the inner end of a shaft 155 to the outer end of which an operating hand wheel 154 is secured. When, therefore, by the described mechanism said tool slide may be moved up or down as required by the turning of a hand wheel 154, because thereby through the mechanism which has just been described the operator will rotate shaft 54 whereby through mechanism which is provided for the purpose the cam disk 55 will be turned and the tool slide moved up and down as the result of so doing.

When it is desired to reconnect the particular tool slide with the proper driving mechanism therefor the operator reverses the movement of the lever 145 and thereby slide 149 is moved up, which releases the clutch lever 84 and thereby permits that lever to be moved by the reaction of the spring plunger which it carries, back to the same position it was in before it was moved to neutral position as stated, and so the clutch will be engaged again. Thereupon the slide moving mechanism begins to move the slide and the slide completed the cycle which was interrupted as above stated.

It is customary in this art to provide automatic machine tools with known mechanisms for performing desirable functions, for example, it is customary to provide counter-weights for vertically movable tool slides, and such counter-weights will probably be desirable adjuncts of the machine herein shown and described. It is also customary to provide mechanism for sliding a gear along the shaft on which it is slidably mounted, and to hold it in desired positions thereon for various purposes. Some mechanism of this sort is doubtless desirable in the machine described for co-operation with the sliding gear 31. It has not, however, been thought necessary to show these well known mechanisms in the drawings of the present machine, because they are not parts of the present invention, although they may be desirable adjuncts of the machine.

Attention is called to certain features of construction which are important from a manufacturing viewpoint, because they greatly reduce the cost of assembling the parts of the machine in operative relation with one another; and which are also important for the reason that they make the several feed works easily accessible for repair or adjustment. Each of the feed works is as stated, located in the hollow base of the machine. Associated with each feed works are the gears 74, 75, 39, which are rotatably supported on the adjacent wall of the hollow central column. The sliding block 62 is also mounted to slide in a guideway on the central column,—said block being the block which carries the roller 60. All of the other parts of each feed works are supported on a frame 190 so as to form a unit which may be assembled and adjusted outside of the machine. In the wall of the hollow base 170 are numerous openings over each of which is an easily removable door 177. Each of these openings is large enough to permit a feed unit to be passed through it and then moved to such position that the gears 76 and 45 which are a part of this unit will slip into mesh with gears 75 and 39 respectively. And at the same time the roller 60 will enter the cam groove in the cam disk 55. When the feed units have been moved to position such that the stated operative engagements have taken place, the frame 190 of said feed unit may be fixed to the bottom plate of the hollow base and the feed works will then be in place to perform their several functions, as before explained.

As before stated the construction as described is one which may be taken advantage of to insure the adequate lubrication of all of the moving parts. The base constructed as shown and described constitutes a chamber which may contain a deep pool of oil in which a part of the mechanism will be submerged. The rotating part will lift this oil and distribute it to those moving parts which are not so submerged.

Also in the upper part of the hollow center column is an oil chamber formed by the transverse partition 176,—and this chamber contains numerous moving parts which have before been described. This chamber may contain a deep pool of oil in which this mechanism may be wholly or partly submerged. Oil may be allowed to drain from this chamber down onto the various mechanisms in the hollow column below the partition 176.

It will be apparent to those skilled in the art that many of the specific instrumentalities shown and described for accomplishing stated and specific results might be superseded by other means having equivalent functions. In fact, many changes may obviously be made in the specific construction shown without departure from the invention. It is, therefore, the intention that the appended claims shall cover and include not only the combinations which they specifically define, but all combinations in which other equivalent elements or groups of elements are substituted.

Having described my invention, I claim:—

1. In a machine of the character described, the combination of a plurality of vertically movable tool slides, an equal number of tool slide feed units,—one associated with each tool slide and located below the same, and a plurality of sliding bars each of which has an operative connection with the associated tool slide feed unit and extends upward therefrom and is connected with the associated tool slide, a spindle carrier having work spindles adapted to co-operate with the different tool slides.

2. In a machine of the character specified, the combination of a hollow base, a hollow column rising from and centrally placed within the hollow base, a plurality of tool slides mounted on said column above the base, an equal number of tool slide feed units within the base, and a plurality of endwise movable bars which are respectively connected at their upper ends with the tool slides and which extend downward therefrom within the hollow column and into the base,—each bar having an operative connection with one of the tool slide feed units.

3. In a machine of the character specified, the combination of a hollow base, a hollow column rising centrally therefrom, a plurality of vertically movable tool slides mounted upon said column, an equal number of tool slide feed units each comprising a cam, gearing for rotating said cam, and a frame upon which said cam and gearing are mounted,—the base having a plurality of openings each large enough for a tool slide feed unit to pass through, doors removably secured over said openings, a vertically movable rod associated with a tool slide and a tool slide feed unit,—each of which rods is connected with the associated tool slide and extends downward within the hollow column and has at its lower end an operative engagement with the cam of the associated feed unit.

4. In a machine of the character specified, the combination of a hollow base, a hollow column rising centrally therefrom, a plurality of vertically movable tool slides mounted upon said column, an equal number of tool slide feed units each comprising a cam, gearing for rotating said cam, and a frame upon which said cam and gearing are mounted,—the base having a plurality of openings each large enough for a tool slide feed unit to pass through, doors removably secured over said openings, a vertically movable rod associated with a tool slide and a tool slide feed unit,—each of which rods is connected with the associated tool slide and extends downward within the hollow column and has at its lower end an operative engagement with the cam of the associated feed unit, and mechanisms mounted on the central column for driving the gearing of the several feed units.

5. The combination of a hollow base, and a hollow column rising centrally therefrom, with a plurality of feed units located in said base, tool slides operated by the feed units, two gears which are rotatably mounted on the hollow column and which mesh with gears in the feed unit, and means for independently rotating the two gears mounted on said hollow column.

6. The combination of a hollow base and a hollow column rising centrally therefrom, of a plurality of feed units located in said base, two gears which are rotatably mounted on the hollow column and which mesh with gears in the feed unit, means for independently rotating the two gears mounted on said hollow column, each feed unit comprising a cam disk having a cam groove in one face and two trains of mechanism whereby said cam disk may be rotated selectively by the two gears mounted on the column, a tool slide associated with the feed unit, and a sliding bar supported upon and located within the hollow column and connected at its upper end with the associated feed slide and carrying on its lower end a roller which projects into the cam groove of the cam disk.

7. In a machine of the character described, the combination of a plurality of vertically movable tool slides, an equal number of tool slide feed units one associated with each tool slide and located below the same, a plurality of sliding bars each of which has an operative connection with one of the feed units and extends upward therefrom and is connected with the associated tool slide, a vertically movable center control rod for starting the operation of the several feed units, a plurality of spring-actuated catch pins adapted to engage said control rod to hold it up, and a beveled arm which is connected to each of the sliding bars and which engages the associated catch pin and moves it into the inoperative position when the associated tool slide has reached the top of its path of movement.

8. The combination of a hollow base, a hollow column extending centrally up from the bottom of the base, a plurality of tool slides mounted on the central column, an equal number of feed units within the hollow base, removable doors covering openings in the hollow base adjacent the several feed works, and a sliding bar associated with each feed unit having an operative connection therewith and extending upward within the central column and is connected adjacent its upper end with the associated tool slide.

9. The combination of a hollow base, a hollow column extending centrally up from the bottom of the base, a plurality of tool slides mounted on the central column above the base, an equal number of feed units located within the hollow base each constructed as a unit and comprising a cam disk, two gears mounted on the hollow central column in position to mesh with two gears of a feed unit, independent mechanisms for rotating the two gears mounted on the central column, a vertically slidable bar associated with each feed works and associated tool slide which sliding bar is located within the central column and is connected at its upper end with the tool slide and carries at its lower end a roller for engagement by said cam disk.

10. In a machine of the character specified, the combination of a hollow base, a hollow column rising from and centrally placed within the hollow base, a plurality of tool slides mounted on said column above the base, an equal number of tool slide operating mechanisms within the base, and a plurality of endwise movable bars which are respectively connected at their upper ends with the tool slides and which extend downward therefrom within the hollow column and into the base each bar having an operative connection with one of the tool slide operating mechanisms, a turret rotatable around the central column, the base having a concentric annular track on which the turret is supported thereby covering all of the tool slide operating mechanisms.

11. In a machine of the character specified, the combination of a hollow base, a hollow column rising from and centrally placed within the hollow base, a plurality of tool slides mounted on said column above the base, an equal number of tool slide operating mechanisms within the base, and a plurality of endwise movable bars which are respectively connected at their upper ends with the tool slides and which extend downward therefrom within the hollow column and into the base each bar having an operative connection with one of the tool slide operating mechanisms, a turret rotatable around the central column, the base having a concentric annular track on which the turret is supported thereby covering all of the tool slide operating mechanisms, a plurality of work spindles mounted on the turret, means for periodically indexing the turret, and mechanisms for rotating said work spindles and for operating the tool slide operating mechanisms.

12. The combination of a hollow base which is provided with an annular track, a coaxial hollow central column, a rotatable turret supported around and coaxially with said hollow central column, which turret rests upon said annular track, means for indexing said turret, and means for locking said turret in various positions, and means to clamp the turret down upon the annular supporting track when it has been locked in working position.

13. In a machine of the character specified, a hollow base, and a hollow column rising therefrom, a turret rotatable about the hollow column resting upon a circular track which is a part of the base, a center control rod movable endwise up and down, means for indexing said turret which means is rendered operative by the descent of the center control rod, and means operable by the center control rod as it ascends to clamp the turret on the circular track on which it is supported, and means carried by the indexing mechanism for raising said center control rod.

14. In a machine of the character specified, a hollow base, and a hollow column rising therefrom, a turret rotatable about the hollow column resting upon a circular track which is a part of the base, a center control rod movable endwise up and down, means for indexing said turret which means in rendered operative by the descent of the center control rod, and means operable by the center control rod as it ascends to clamp the turret on the circular track on which it is supported, and means carried by the indexing mechanism for raising said center control rod, and means operable also by the indexing mechanism for disconnecting it from the means by which it is driven.

15. The combination of a hollow base, a central column, a rotatable turret supported around and coaxially with said hollow central column which turret rests upon an annular track which is a part of the hollow base, means for indexing said turret, and means for locking said turret in various positions, and means to clamp the turret down upon the circular supporting track when it has been locked in working position, a vertically movable center control rod, indexing mechanism for the turret which indexing mechanism when the turret has been moved to working position will raise said center control rod, and means through which the upward movement of said center control rod will actuate the mechanism for clamping the turret upon the circular supporting track therefor, clamping mechanism comprising a plurality of toggle mechanisms each comprising a lever pivoted to the central column carrying a roller on its lower end adapted to engage a part of the turret, and a link pivotally connected with said lever and extending therefrom toward the axis of the machine, and a spider fixed to the center control rod to which the several links are pivotally connected.

16. In a machine of the character specified, the combination of a hollow base having a circular track, a central column, a turret rotatable about said central column and supported upon said circular track, means for indexing the turret, means for locking the turret, and means for clamping the turret down upon said circular track.

17. In a machine of the character specified, the combination of a hollow base having a circular track, a central column, a turret rotatable about said central column and supported upon said circular track, means for indexing the turret, means for locking the turret, and means for clamping the turret down upon said circular track, a slidable controller for initiating the movement of the indexing mechanism as it moves in one direction and for operating the turret clamping mechanism as it moves in the opposite direction, and means carried by the indexing mechanism for moving said controller.

18. In a machine of the character specified, the combination of a hollow base, a hollow central column, a plurality of feed units secured in said base, a beveled gear mounted centrally within the hollow column and near the lower end thereof, a plurality of beveled gears for transmitting motion from said centrally placed beveled gear to the respective feed units, means for continuously rotating the centrally placed beveled gear, a second train of mechanism for driving each feed unit, means including a clutch for simultaneously driving all of said trains of mechanism, a slidable controller, means through which it operates the above mentioned clutch, two gears which constitute a part of each feed unit and which are respectively operated by the two trains of mechanism described, a cam member, a clutch for selectively connecting the cam member with the two gears referred to, clutch operating mechanism, and means carried by the cam member for actuating said clutch operating mechanism.

19. In a machine of the character specified, the combination of a hollow base, a hollow central column, a plurality of feed units secured in said base, a beveled gear mounted centrally within the hollow column and near the lower end thereof, a plurality of beveled gears for transmitting motion from said centrally placed beveled gear to the respective feed units, means for continuously rotating the centrally placed beveled gear, a second train of mechanism for driving each feed unit, means including a clutch for simultaneously driving all of said trains of mechanism, a slidable controller, means through which it operates the above mentioned clutch, two gears which constitute a part of each feed unit and which are respectively operated by the two trains of mechanism described, a cam member, a clutch for selectively connecting the cam member with the two gears referred to, clutch operating mechanism, means carried by the cam member for actuating said clutch operating mechanism, a turret rotatable about the center column, turret indexing mechanism, means operable by said controller as it descends to initiate the movement of said turret indexing mechanism, other means operable by said controller as it descends for releasing the clutch which is a part of the said second train of mechanism and to close said clutch as it ascends, and other means operable by the controller as it moves up to render operative the mechanism for operating the clutches which are parts of each feed unit.

20. The combination of a plurality of tool slides and associated with each of said tool slides a feed unit which includes a cam member, a shaft to which said disk is secured, and a control disk mounted on said shaft and adapted to have a limited rotary movement upon said shaft, two sets of driving mechanism for said cam member, a single sliding clutch member adapted to selectively connect said two mechanisms with the cam member or to occupy a neutral position wherein both of said mechanisms are disconnected from the cam member, means operated by said control disk to move said clutch member into neutral position, a vertically movable center controller, carrying a beveled collar, a pivoted lever adapted to be engaged and operated by said collar when the controller moves upward, and a plurality of spring pins which are aligned when the cam member has finished one rotation,—and which when aligned are operable by said lever, one of said spring pins being carried by said cam member, means through which said aligned series of spring pins will turn the control disk and thereby release the clutch member, and means by which the clutch member when released is automatically moved into operative position and into engagement with the fast train of mechanism for turning the cam member.

21. The combination of a rotatable turret, a plurality of work spindles rotatably mounted thereon, means for indexing said turret, a vertically movable controller and means through which said controller when it descends will start said indexing mechanism in operation, an operator's catch pin adapted to engage a collar on the controller to hold it up, a manually operable rock shaft, and means through which by turning said rock shaft the operator's catch pin will be withdrawn.

22. The combination of a rotatable turret, a plurality of work spindles rotatably mounted thereon, means for indexing said turret, a vertically movable center control rod, and means through which said control rod when it descends will start said indexing mechanism in operation, a spring actuated catch pin adapted to engage a collar on the center control rod to hold it up, a manually operable rock shaft, means through which by turning said rock shaft the spring actuated catch pin will be withdrawn, a lever,—one arm of which extends into the path of a shoulder on said center control rod, a lever fixed to said rock shaft adapted to be moved into operative position with respect to said lever for turning said rock shaft in one direction to withdraw said catch pin.

23. The combination of a vertically movable center control rod, a spring actuated catch pin for holding said control rod up, a lever having one end extended below a shoulder on said center control rod, a manually operable rock shaft, and means operable by turning the rock shaft in either direction to withdraw said catch pin, and an arm fixed to said rock shaft and adapted to be moved into operative relation with said lever when said rock shaft is turned in one direction to withdraw said catch pin.

24. The combination of a center control rod, a spring actuated catch pin adapted to engage the same and hold it up, a rock shaft, two cams thereon through which by turning the rock shaft in either direction the catch pin will be withdrawn, a lever having one end which projects beneath the collar in said center control rod, and an arm fixed to said rock shaft in position such that when the rock shaft is turned in one direction to withdraw the catch pin this arm is brought into operative relation with said lever whereby when the center control rod descends it will turn the rock shaft and release the catch pin and permit it to move to a position where it will automatically engage the center control rod when it next moves up and to hold it up.

25. In a machine of the character specified, the combination of a rotatable turret, a plurality of work spindles rotatably mounted thereon, means for indexing the turret, a plurality of tool slides, means for operating the tool slides and work spindles, and a slidable controller which in its downward movement sets the indexing mechanism in operation and in its upward movement sets in operation the mechanisms for actuating the tool slides and work spindles, a spring actuated catch pin to engage said controller and hold it up, manually operable means for withdrawing said catch pin, and mechanism operable by the controller in its downward movement for actuating the catch pin operating mechanism to the end that said catch pin will be released and permitted to automatically engage the controller when it next moves up.

26. In a machine of the character specified, the combination of a tool slide operating mechanism including a cam, fast and slow driving members therefor, clutch mechanism for selectively connecting the fast and slow driving members with said mechanism, a manually operable shaft independent of said mechanism, and a train of mechanism including a clutch intermediate of said manually operable shaft and cam for turning the latter.

27. In a machine of the character specified, the combination of a tool slide operating mechanism including a cam, fast and slow driving members therefor, clutch mechanism for selectively connecting the fast and slow driving members with said mechanism, a manually operable shaft, and a train of mechanism including a clutch intermediate of said manually operable shaft and cam for turning the latter, means to simultaneously move the first named clutch mechanism into neutral position to disconnect the cam from both fast and slow driving members therefor, and to close the other clutch and thereby connect the cam with the manually operable train of mechanism.

28. In a machine of the character specified, the combination of a tool slide operating mechanism including a cam, fast and slow driving members therefor, clutch mechanism for selectively connecting the fast and slow driving members with said mechanism, a single clutch operating lever, a manually operable train of mechanism including a clutch for turning said cam, a slide having a slot through which the above named clutch operating lever extends,—said slot having both its sides beveled, and means for simultaneously moving said slide to draw said clutch lever into neutral position and for closing the clutch which is a part of the manually operable mechanism.

29. In a machine of the character specified, the combination of a hollow base, a hollow central column, a plurality of tool slides mounted on said column, an equal number of feed units each comprising a cam mounted in the base, a bevel gear mounted centrally within the low part of the hollow column, and a plurality of bevel gears rotatably mounted in the wall of the hollow column engaging said bevel gear, each feed unit comprising a train of mechanism through which one of these bevel gears may drive the cam which forms a part of the feed unit, and a rod associated with each feed unit and connected at its upper end with said tool slide extending downward therefrom within the hollow column having at its lower end an operative engagement with the cam of the associated feed unit.

30. In a machine of the character specified, the combination of a rotatable turret carrying a plurality of work spindles, a plurality of tool slides, indexing mechanism for said turret, a vertically movable control rod which as it moves down initiates the operation of the indexing mechanism, a plurality of catch pins one associated with each tool slide for engaging said center control rod to prevent its downward movement, a plurality of feed units for respectively operating the tool slides, a bar to transmit motion from each feed unit to the associated tool slide,—each bar carrying an inclined arm, and each catch pin having a shoulder for said arm to engage with, whereby each catch pin is withdrawn as the associated tool slide arrives at its home position.

31. In a machine of the character specified, the combination of a tool slide, a feed unit therefor located below the tool slide, a bar for transmitting motion from the feed unit to the tool slide, an inclined arm which moves in unison with the tool slide, a rotatable turret, indexing mechanism therefor, a vertically movable center control rod for initiating the operation of said indexing mechanism as it moves downward, a spring actuated catch pin for engaging said center control rod to prevent its downward movement, said catch pin having a shoulder with which said inclined arm engages to retract the catch pin as the tool slide moves to its home position.

32. In a machine of the character specified, the combination of a hollow base having a circular track, a central column, a turret rotatable about said central column and supported upon said circular track, a turret centering device adjustably fixed to said central column, means for indexing the turret, means for locking the turret, and means for clamping the turret down upon said circular track.

33. In a machine of the character specified, the combination of a rotatable turret, indexing mechanism therefor including a clutch, a slidable controller, means by which said controller in moving in one direction closes said clutch, means operable by said indexing mechanism to move said controller in the reverse direction and to prevent its movement in the first mentioned direction until after the indexing mechanism has completed its cycle.

34. In a machine of the character specified, the combination of a rotatable turret, indexing mechanism therefor including a clutch, a controller, means by which said controller in moving in one direction closes said clutch, means operable by said indexing mechanism to shift said controller in the opposite direction and to prevent its movement in the first mentioned direction until after the indexing mechanism has completed its cycle, and other mechanism operable by said indexing mechanism to prevent the release of said clutch until the indexing mechanism has completed its cycle.

35. In a machine of the character specified, the combination of a frame which includes a hollow central column having near its upper end a transverse partition which forms above the partition an oil holding chamber, mechanism mounted in said chamber whereby it may be partly submerged in oil within said chamber and other mechanism within the hollow column below said partition onto which oil may fall by gravity from said oil containing chamber.

36. The combination of a hollow base and a column rising therefrom, a plurality of tool slides mounted on said column, a feed unit for each tool slide located in said base, gearing for operating the feed unit and including a gear mounted on the column and a second gear meshing therewith and forming a part of the feed unit.

37. In a machine tool the combination of a hollow base, a tool slide having a suitable support, a feed unit in the base for operating the tool slide, means for operating the feed unit comprising a gear supported independently of the feed unit and a gear meshing therewith and forming a part of the feed unit, said feed unit being removable from the base, and said gear of the feed unit sliding in mesh with said first mentioned gear when the feed unit is moved into operative position.

38. The combination of a hollow base, a tool slide, a support for the tool slide carried by the base, a feed unit located in the base including a cam member having a cam groove, a member engaging in the groove and connected to the slide to operate the same, gearing for rotating the cam member and including a gear in the feed unit and a gear meshing therewith and supported independently of the feed unit, the parts being so arranged that the feed unit may be removed from the base and when restored to operative position the cam groove of the cam member comes into operative relation with the part which engages the cam groove, and said gear of the feed unit slides into mesh with said gear supported independently of the feed unit.

39. In a machine tool, the combination of a hollow base, a tool slide having a support mounted upon the base, a feed unit for the tool slide located in the base, including a cam member having a cam groove, a member engaging said groove and connected to the tool slide to operate the same, gearing for rotating the cam member and including a gear on the feed unit and a gear which meshes with said first named gear and is supported independently of the feed unit, a clutch forming a part of the feed unit for controlling the rotation of the cam member, clutch operating means supported independently of the feed unit, said feed unit being removable from the base and when restored to proper position in the base the groove of the cam member is engaged by the part normally received in the cam groove, said gear of the feed unit slides into mesh with said gear supported independently of the feed unit, and said clutch assumes operative relation with respect to said part which is supported independently of the feed unit and which operates it.

40. In a machine tool, the combination of a hollow base, a tool slide having a support mounted on the base, a feed unit in the hollow base and including a cam member and a part operated thereby and connected to the tool slide to operate the same, gear trains for operating said cam member at different speeds, the feed unit being removable from the base and when restored to proper position therein certain gears of said gear train part in said feed unit and part supported independently of the feed unit slide into mesh.

41. In a machine of the character described, a rotary carrier having a plurality of work spindles, a plurality of tool slides, an indexing mechanism for the carrier, driving mechanisms for the said parts, means for controlling the functioning thereof, comprising a controller, a plurality of restraining devices for preventing movement of the controller, part of said devices being automatically actuated and one manually actuated and means whereby said manually actuated restraining device is automatically restored to a position for again restraining movement of the controller.

42. In a machine of the character described, a rotary carrier having a plurality of work spindles, a plurality of tool slides, an indexing mechanism for the carrier, driving mechanisms for said parts, means for controlling the functioning thereof comprising a controller movable first in one direction and then in the opposite direction in the performance of its controlling functions, a plurality of restraining devices for preventing movement of the controller in the first mentioned direction, part of said devices being automatically actuated, and one manually actuated, and means whereby during the movement of the controller in the second direction said manually actuated restraining device is automatically restored to a position for again restraining movement of the controller in the first named direction.

In testimony whereof, I hereunto affix my signature.

JOHN J. N. VAN HAMERSVELD.